United States Patent
Chang et al.

(10) Patent No.: US 10,601,266 B2
(45) Date of Patent: Mar. 24, 2020

(54) BRUSHLESS CAN MOTOR

(71) Applicant: TTI (MACAO COMMERCIAL OFFSHORE) LIMITED, Macau (MO)

(72) Inventors: Yijia Chang, Dongguan (CN); Kaiming Wei, Dongguan (CN); Jianwei He, Dongguan (CN); Zhicun Qian, Dongguan (CN)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 74 days.

(21) Appl. No.: 15/577,955

(22) PCT Filed: Jun. 1, 2015

(86) PCT No.: PCT/CN2015/080470
§ 371 (c)(1),
(2) Date: Nov. 29, 2017

(87) PCT Pub. No.: WO2016/192003
PCT Pub. Date: Dec. 8, 2016

(65) Prior Publication Data
US 2018/0152062 A1 May 31, 2018

(51) Int. Cl.
*H02K 1/18* (2006.01)
*H02K 5/15* (2006.01)
(Continued)

(52) U.S. Cl.
CPC ............... *H02K 1/185* (2013.01); *H02K 1/16* (2013.01); *H02K 1/2753* (2013.01); *H02K 5/15* (2013.01);
(Continued)

(58) Field of Classification Search
CPC ........ H02K 1/185; H02K 1/16; H02K 1/2753; H02K 7/145; H02K 11/215
(Continued)

(56) References Cited

U.S. PATENT DOCUMENTS 8,421,282 B2    4/2013 Ota
2006/0261689 A1* 11/2006 Natsuhara ............... H02K 5/15
                                                           310/64
(Continued)

FOREIGN PATENT DOCUMENTS

CN    202475042        10/2012
CN    104104200 A      10/2014
(Continued)

OTHER PUBLICATIONS

International Search Report and Written Opinion for Application No. PCT/CN2015/080470 dated Feb. 26, 2016, 7 pages.
Chinese Patent Office Action for Application No. 201580080462.1 dated Dec. 13, 2019 (9 pages including statement of relevance).

*Primary Examiner* — Hanh N Nguyen
(74) *Attorney, Agent, or Firm* — Michael Best & Friedrich LLP

(57) ABSTRACT

A brushless can motor includes a motor shaft, a rotor fixed to the motor shaft, a first end cap on which a first end of the motor shaft is rotatably supported, a second end cap on which a second end of the motor shaft is rotatably supported, and a stator placed between the first end cap and the second end cap along a longitudinal direction of the brushless motor. The rotor includes a plurality of magnets. The stator is configured with a plurality of windings adapted to connect to an external motor controller. The first end cap, the second end cap, and the stator are all formed in substantially cylindrical shape, such that said brushless motor, in its assembled form, has a substantially can shape.

14 Claims, 9 Drawing Sheets

(51) Int. Cl.
*H02K 11/215* (2016.01)
*H02K 1/16* (2006.01)
*H02K 1/27* (2006.01)
*H02K 5/22* (2006.01)
*H02K 7/14* (2006.01)
H02K 5/04 (2006.01)
H02K 29/08 (2006.01)

(52) U.S. Cl.
CPC ............ *H02K 5/225* (2013.01); *H02K 7/145* (2013.01); *H02K 11/215* (2016.01); *H02K 5/04* (2013.01); *H02K 29/08* (2013.01); *H02K 2211/03* (2013.01)

(58) Field of Classification Search
USPC .......................................................... 310/50
See application file for complete search history.

(56) References Cited

U.S. PATENT DOCUMENTS

| | | | |
|---|---|---|---|
| 2011/0273041 A1* | 11/2011 | Tseng | H02K 1/16 310/62 |
| 2011/0291514 A1 | 12/2011 | Figgins et al. | |
| 2013/0207491 A1* | 8/2013 | Hatfield | H02K 3/522 310/50 |
| 2013/0229084 A1* | 9/2013 | Allen | H02K 1/16 310/216.008 |

FOREIGN PATENT DOCUMENTS

| | | |
|---|---|---|
| CN | 104393733 | 3/2015 |
| DE | 102009033119 A1 | 12/2010 |

* cited by examiner

BRUSHLESS CAN MOTOR

FIELD OF INVENTION

This invention relates to electrical motors, and in particular to the structure of brushless direct current (DC) motors.

BACKGROUND OF INVENTION

In the field of power tools, and specifically in the field of battery-powered hand tools such as drills, one common type of motors used to provide the driving force is a self-contained "can-type" or "can" motor. They are permanent magnet DC motors and usually come with the armature wound on an iron core. Can motors typically include a housing in the form of a cylindrical can in which essentially all of the components of the motor are received, including the armature, magnets, brushes, motor housing, fan, and bearings. Most DC battery-powered tools incorporate a can motor to drive the power tool output due to the simplicity of assembly and low cost of can motors. Can motors are usually not designed to be disassembled and repaired. Rather, when a motor in a power tool burns out or wears out it is cheap enough to simply toss out and replace.

Another import type of DC motors commonly found in power tools are brushless motors. The brushless motor as its name suggests removes the need for commutators and brush assembly in the motor for creating alternating current to drive the motor. Rather, an electrical motor controller usually in the form of a semiconductor circuit or microcontroller takes the role to continually switch the phase to the windings in the motor stator to keep the motor turning. Brushless motors offer many advantages over brushed DC motors, including high torque to weight ratio, more torque per watt (increased efficiency), increased reliability, reduced noise, and longer lifetime.

However, most conventional brushless DC motors are made in the form of "open frame", which means that there is no motor housing or "can" like that in can motors to enclose the brushless motor components. Instead, for open frame brushless motors used in power tools, the components of the motor are often installed in tool housings individually, and the tool housing incorporating open frame motors must be manufactured in factory prior to delivery to the user. As a result, the power tools once manufactured is then difficult to be repaired by the end user when there is a condition with the brushless motor, since the entire tool housing may have to be replaced in order to replace the old brushless motor.

SUMMARY OF INVENTION

In the light of the foregoing background, it is an object of the present invention to provide an alternate brushless motor which overcome or at least alleviate the above problems in the art.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a brushless can motor, which includes a motor shaft, a rotor fixed to the motor shaft, a first end cap on which a first end of the motor shaft is rotatably supported, a second end cap on which a second end of the motor shaft is rotatably supported, and a stator placed between the first end cap and the second end cap along a longitudinal direction of the brushless motor. The rotor includes a plurality of magnets. The stator is configured with a plurality of windings adapted to connect to an external motor controller. The first end cap, the second end cap and the stator are all formed in substantially cylindrical shape, such that the brushless motor in its assembled form has a substantially can shape.

Preferably, the first end cap, the stator and the second end cap are secured together to form the exterior dimension of the brushless motor.

More preferably, the first end cap, the stator and the second end cap are secured using a plurality of fasteners.

In one implementation, the fasteners are screws. Each one of the first and second end caps includes a plurality of receptacles each configured for receiving and securing an end of one the screw.

In one variation, the stator is formed with a plurality of grooves formed on an exterior cylindrical surface of the stator. Each groove is adapted to receive one screw and allow the same to pass through the stator and connect to the first and second end caps at its ends. The screws confine the stator in a predetermined position with respect to the first and second end caps.

In another variation, a portion of an exterior surface of at least one of the first and second end cap is flattened to form a planar exterior face.

In a further variation, the brushless can motor also contains a Hall sensor board placed adjacent to one of the first and second end caps.

In one implementation, at least one of the first and second end caps further contains a plurality of fastening means for securing the brushless motor to an external apparatus.

Preferably, the fastening means are screw holes.

There are many advantages to the present invention. For example the brushless DC motor according to the present invention has a form factor which is the same as a traditional can motor. With the motor being in a substantial cylindrical shape, the brushless DC motor can be used to replace can motors which has similar or identical dimensions in various electrical appliances including power tools. Apparently, old electrical appliances will benefit from the advantages brought by brushless DC motors over conventional DC can motors including but not limited to high torque to weight ratio, more torque per watt, increased reliability, reduced noise, and longer lifetime. More importantly, the user does not have to invest in new electrical appliances to obtain enhanced performance, but rather he can simply change the motors in the old electrical appliances to brushless DC motors according to the present invention, together with other necessary modules such as brushless motor controllers.

Another advantage of the present invention is that as all the motor components are accommodated within the motor casing consisted of the end caps and the stator, the motor as an integral part can be easily installed to electrical appliance such as power tools, or be removed from the same. Thus, the maintenance and service to the brushless DC motor is made easy and convenient to traditional brushless motors, as a malfunctioning motor can be replaced with a new one without affecting other parts of the electrical appliance.

BRIEF DESCRIPTION OF FIGURES

The foregoing and further features of the present invention will be apparent from the following description of preferred embodiments which are provided by way of example only in connection with the accompanying figures, of which.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Figure 1:
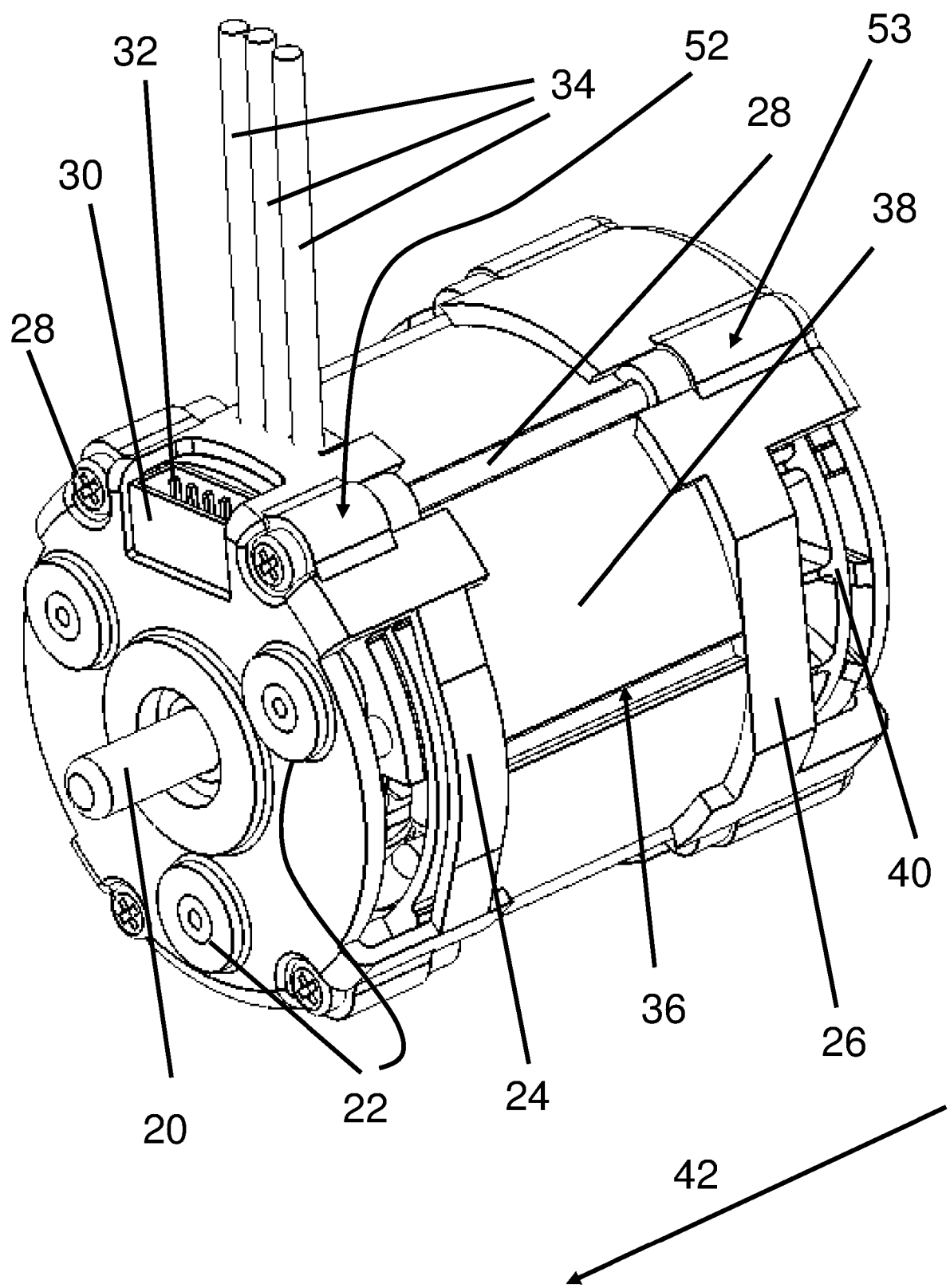
FIG. 1 is a perspective view of a brushless motor according to one embodiment of the present invention.
Figure 2:
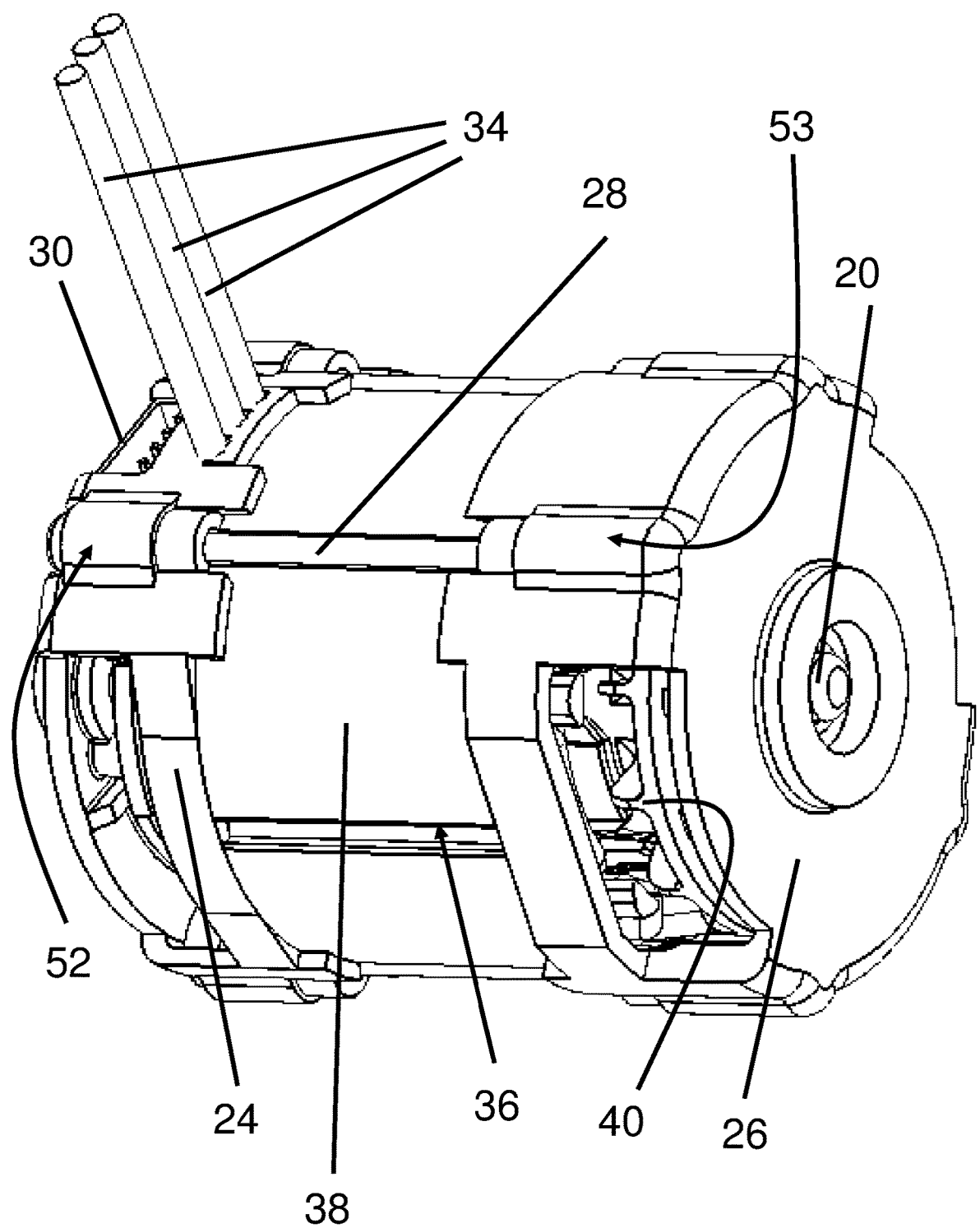
FIG. 2 shows the brushless motor in FIG. 1 from another orientation.

Referring now to FIGS. 1 and 2, the first embodiment of the present invention is a brushless DC motor which has a substantially cylindrical can shape. The brushless can motor in FIG. 1 includes a motor shaft 20, a first end cap 24, a stator 38, and a second end cap 26, all of which are arranged concentrically along the axis defined by the motor shaft 20. The motor shaft 20 has an extended first end out of the first end cap 24 so that the motor shaft can be coupled to other transmission parts in electrical appliances like power tools to provide rotational driving force to the electrical appliance. There are three electrical lead 34 to electrically connect the brushless can motor to an external motor controller for the brushless motor to be driven according to the alternating signal supplied by the motor controller. Moreover, one the circular face of the first end cap 24 there are three screw holes 22. These screw holes 22 are used to connect the brushless motor by using screws (not shown) for example to tool housing of a power tool in which the brushless motor is installed. On the first end cap 24 there is a configured a male socket 30 containing a number of pins 32 in the socket 30. These pins 32 are used to connect a circuit board (not shown) of the brushless motor to the external motor controller. Near a second end of the motor shaft 20, there is a fan 40 which is enclosed by the second end cap 26. The fan 40 has a circular shape and its diameter is not larger than that of the second end cap 26.

Also shown in FIGS. 1 and 2 are four long screws 28 extending along the axis direction of the motor shaft 20. These screws 28 are used to connect separate pieces of components of the brushless motor together. In particular, on the first end cap 24 there are four open receptacles 52 each corresponding to a screw 28. The open receptacle means that the receptacle has a substantially sleeve shape with both ends open. The screw 28 is adapted to extend through the open receptacle 52 while a screw cap of the screw 28 is limited by the open receptacle 52, therefore securely coupling the first end cap 24 to the screw 28. Likewise, on the second end cap 26 there are also four closed receptacles 53 which are used to receive the tip end of the screws 28. The closed receptacle means that the receptacle has a substantially sleeve shape but one of its end is closed and the other end is open (for receiving the tip end of the screw). In addition, on the stator 38 which has cylindrical exterior surface, there are formed a plurality of grooves 36 along the axis direction of the motor shaft 20. Each of the grooves 36 is adapted to receive one of the screws 28 and allow the same to pass through the stator 38. As the screws 28 securely connect to the first end cap 24 and the second end cap 26 at their two ends, the screws 28 confine the stator 38 in a predetermined position with respect to the first end cap 24 and the second end cap 26. That is, the stator 38 is precisely aligned to the first end cap 24 and the second end cap 26 with respect to their central axis, so that the motor shaft 20 extending out of the stator 38 will be exactly located at the center points of the first end cap 24 and the second end cap 26. Together, the first end cap 24, the stator 38 and the second end cap 26 form the exterior dimension of the brushless DC motor. In other words, the form factor of the brushless DC motor and the required space for accommodating the motor in an electrical appliance is determined by the sizes of the first end cap 24, the stator 38 and the second end cap 26. Any other essential components of the brushless can motor such as the rotor, the insulating plates, the windings, etc, are enclosed in and protected by the motor casing formed by the first end cap 24, the stator 38 and the second end cap 26

Figure 3:
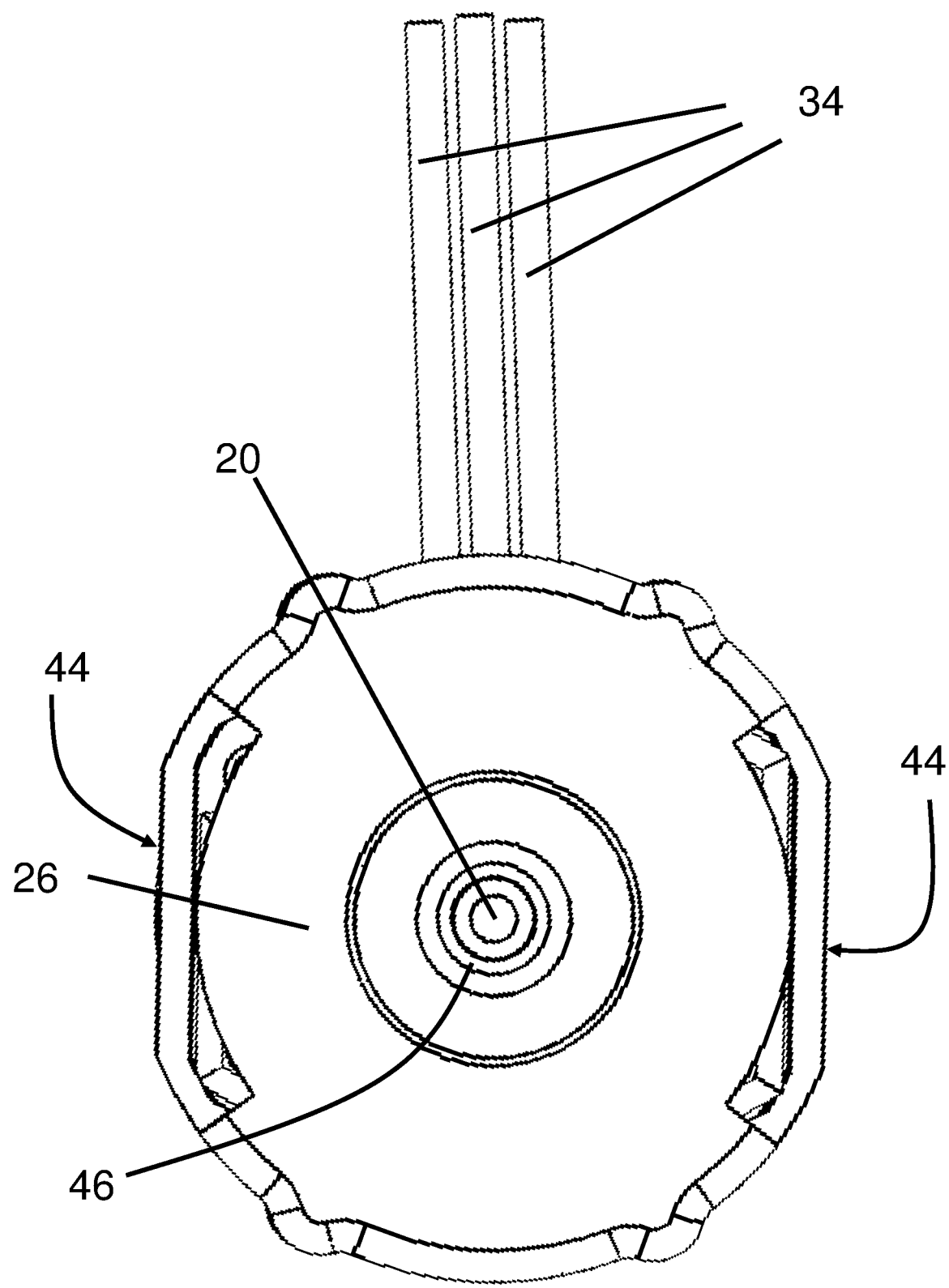
FIG. 3 is the side view of the brushless motor in FIG. 1 along the direction of the arrow 42 in FIG. 1.
Figure 4:
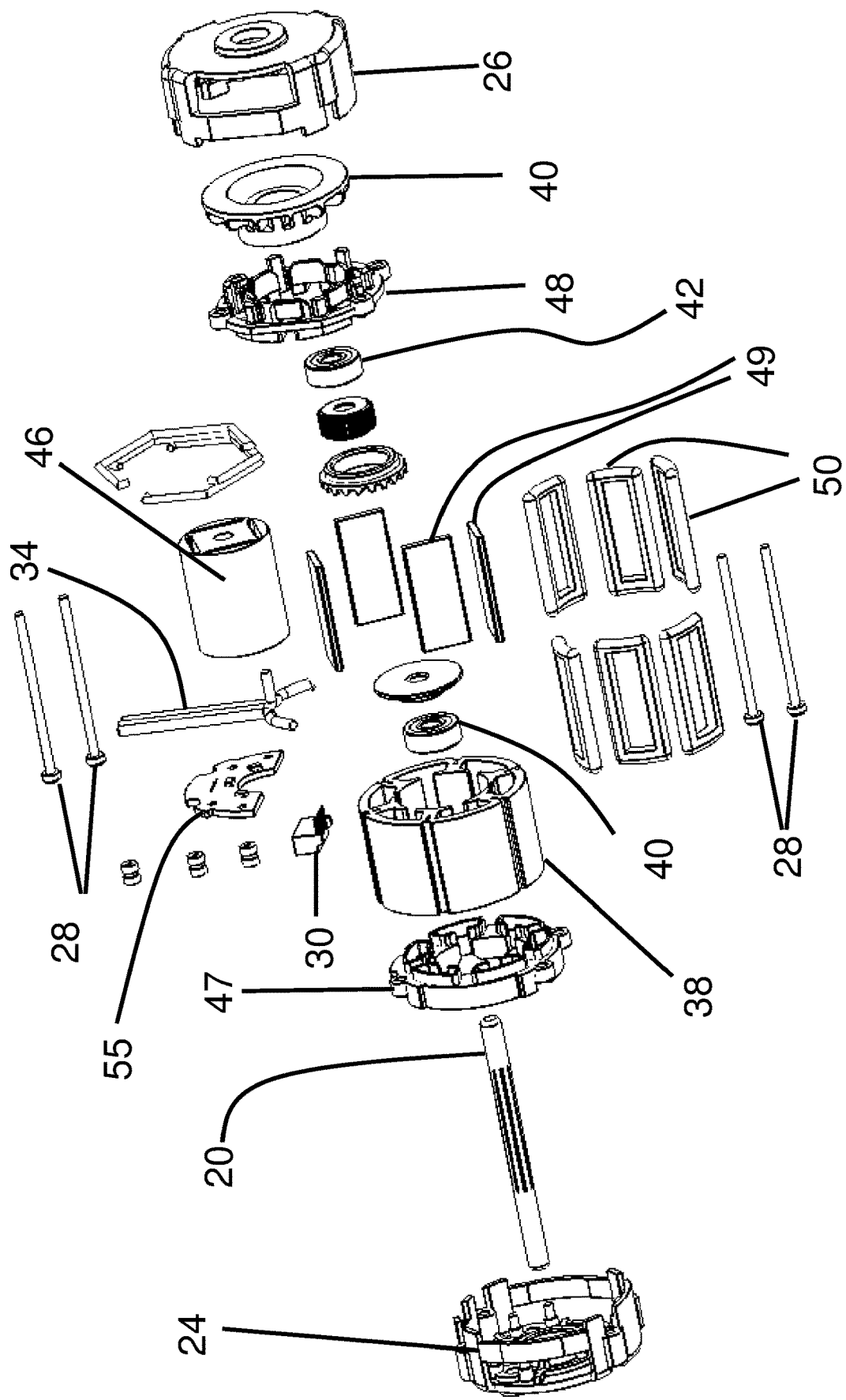
FIG. 4 is an exploded view of the brushless motor in FIG. 1.

Referring now to FIG. 3, a side view of the brushless can motor by looking into the second end cap 26 shows that the second end cap 26 does not have a perfect circular cross-section. Rather, while the second end cap 26 is still considered to be substantially cylindrical, two opposite portions of the exterior surface of the second end cap 26 are flattened to form two planar exterior faces. Such a shape of the second end cap 26 renders the brushless can motor has a form factor even closer to a traditional can motor which also has two planar walls in the motor housing where the planar walls are connected by arc walls.

FIGS. 4-8 show the internal structure of the brushless can motor of FIG. 1 and illustrate the various components described above like the socket 30, the screws 28, the first end cap 24, the second end cap 26, the fan 40, the stator 38, the motor shaft 20 and the electrical leads 34. In addition, a rotor is rotatably received inside the stator 38 and the rotor is fixed to the motor shaft 20 at its center. The rotor includes a rotor core 46 and four plate permanent magnets 49 contained in the rotor core 46. Between the first end cap 24 and the stator 38, there is a first insulating plate 47 configured to electrically isolate the energized components (e.g. the stator windings 50) inside the stator 38 from the first end cap 24. Likewise, between the second end cap 26 and the stator 38, there is a second insulating plate 48 configured to electrically isolate the energized components (e.g. the stator windings 50) inside the stator 38 from the second end cap 26 and the fan 40. There are in total six stator windings 50 in the brushless can motor, which will be described in more details later. The rotor and the motor shaft 20 are supported on the first end cap 24 and the second end cap 26 by bearings 42 on two ends of the motor shaft 20. There is also a circuit board 55 attached to the first end cap 24 and secured between the first end cap 24 and the first insulating plate 47. On the semi-circle shaped circuit board 55, there are configured rotor status sensing devices for detecting the position of the rotor and using the same as basis for generating the alternative signal to the motor. Preferably, the rotor status sensing devices are Hall sensors. The Hall sensors are adapted to sense the rotor positions due to varying magnetic fields generated by the permanent magnets 49 in the rotor. The socket 30 is electrically connected to the circuit board 55 and the external motor controller (not shown) is able to read the rotor status from the Hall sensors.

Figure 5:
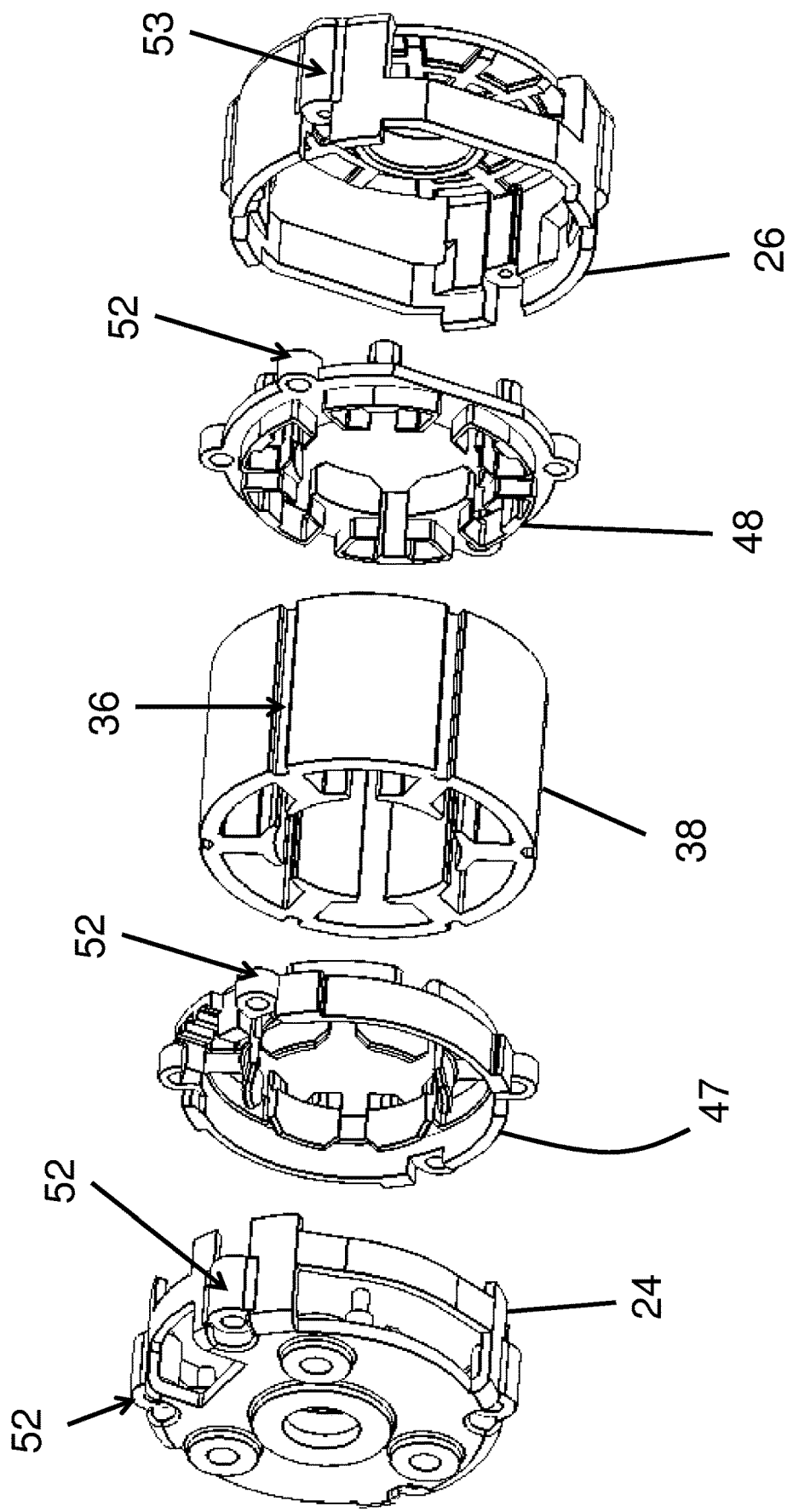
FIG. 5 shows alone the two end caps, the stator and the insulators of the brushless motor in FIG. 1.
Figure 6:
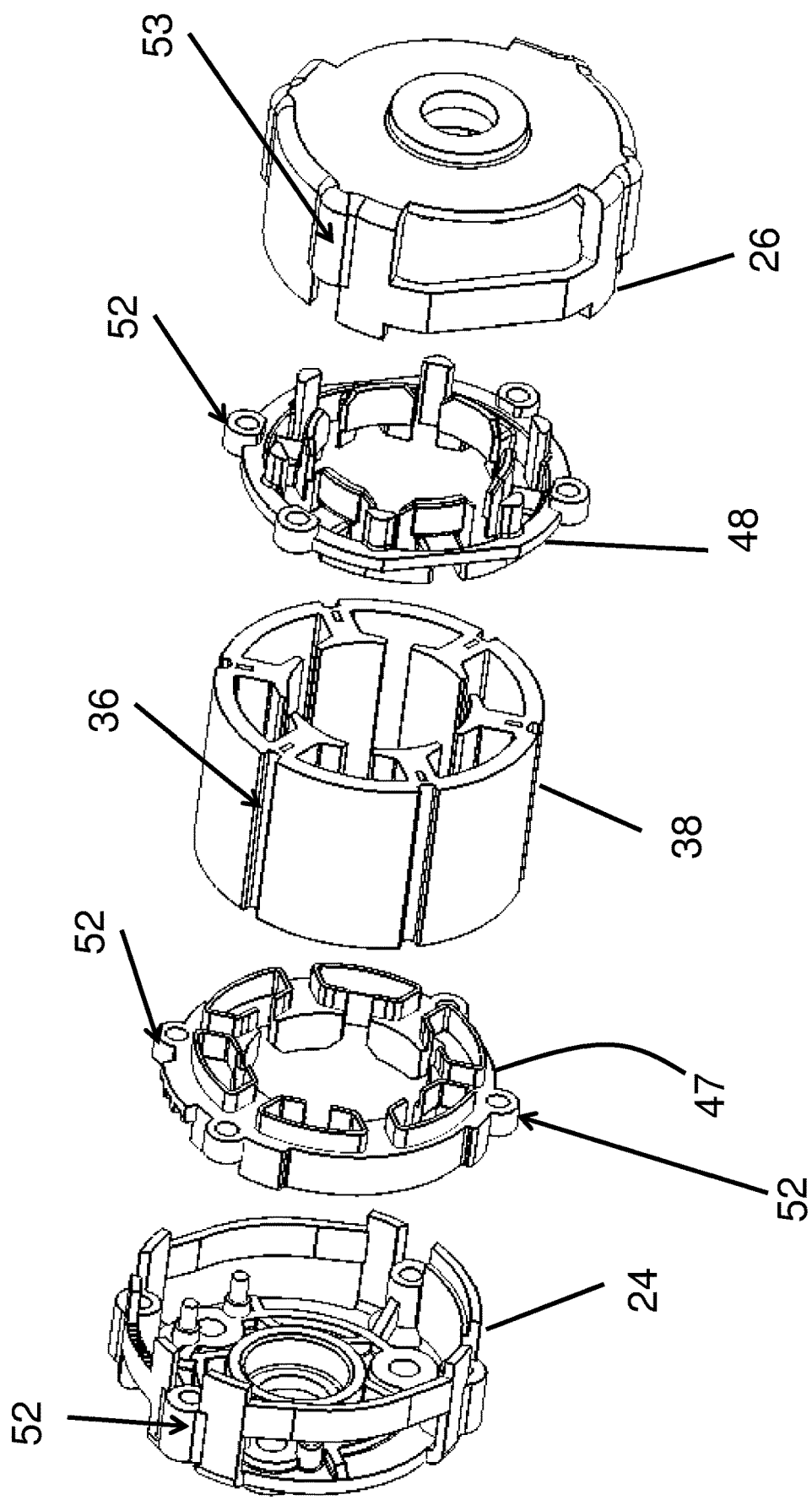
FIG. 6 also shows alone the two end caps, the stator and the insulators similar to FIG. 5, but from another orientation.

FIGS. 5 and 6 show clearly how the insulating plates 47 and 48 are installed in the brushless can motor. On both the first insulating plate 47 and the second insulating plate 48 there are receptacles 52 similar to those on the first end cap 24. These receptacles 52 allow screws (not shown) to pass through and in turn the first insulating plate 47 and the second insulating plate 48 are secured precisely with respect to the stator 38 and the first and second end caps 24 and 26. Each screw therefore extends from its head portion and passes through in turn the receptacle 52 on the first end cap 24, the receptacle 52 on the first insulating plate 47, the groove 36 on the stator 38, the receptacle 52 on the second insulating plate 48, and terminates in the receptacle 53 on the second end cap 26. However, since the first end cap 24 and the second end cap 26 each has a substantially cylindrical shape, the first and second insulating plates 47 and 48 are received within the first end cap 24 and the second end cap 26 respectively, without being exposed to the outside.

Figure 7:
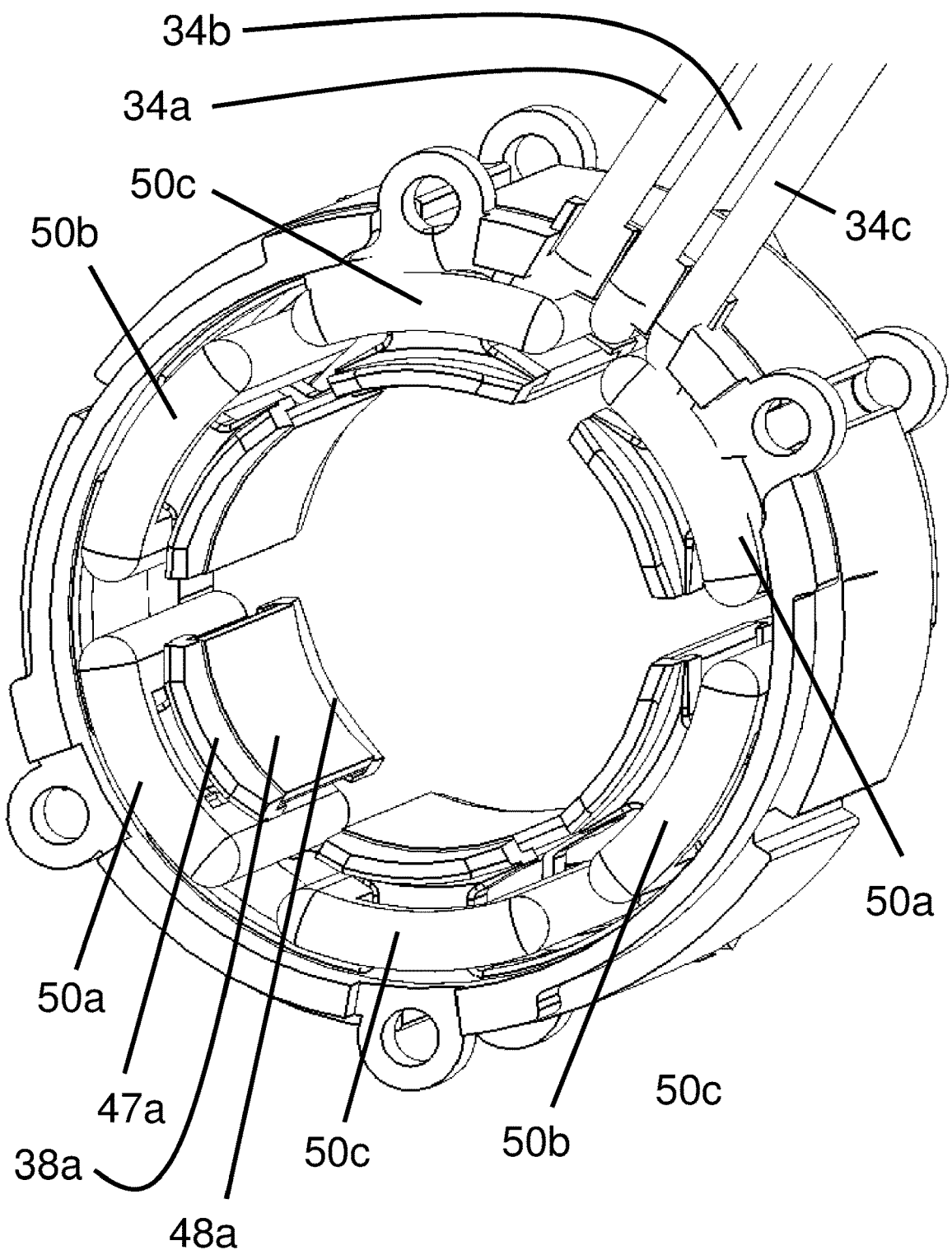
FIG. 7 shows the stator and the insulators of the brushless motor in FIG. 1 which are in their assembled form.

Turning now to FIG. 7, the stator windings of the brushless can motor in FIG. 1 are shown in details. As mentioned above there are three electrical leads connecting the stator windings to the external motor controller. The three electrical leads 34a, 34b and 34c each correspond to one phase of the three phase motor control current. Accordingly, there are also three pairs of stator windings on the stator lamination. The stator windings belonging to the same phase are placed exactly opposite around the center of the stator on the inner circumference of the stator lamination. As one can see in FIG. 7, the two stator windings 50a are both connected to the electrical lead 34a, and the two stator windings 50a on opposite positions on the inner circumference of the stator lamination. Likewise, the two stator windings 50b are both connected to the electrical lead 34b and the two stator windings 50c are both connected to the electrical lead 34c. Note that for each of the stator windings 50a, 50b and 50c, it is wound on a stator tooth which is consisted of separate lamination segments of the first insulating plate, the second insulating plate and the stator. For example, for a stator winding 50a the corresponding stator teeth is formed by the lamination segment 47a of the first insulating plate, the lamination segment 38a of the stator, and the lamination segment 48a of the second insulating plate. Each of the lamination segments 47a, 48a and 38a has a T shape cross-section and the winging 50a is wound around the trunk of the T shape teeth.

Figure 8:
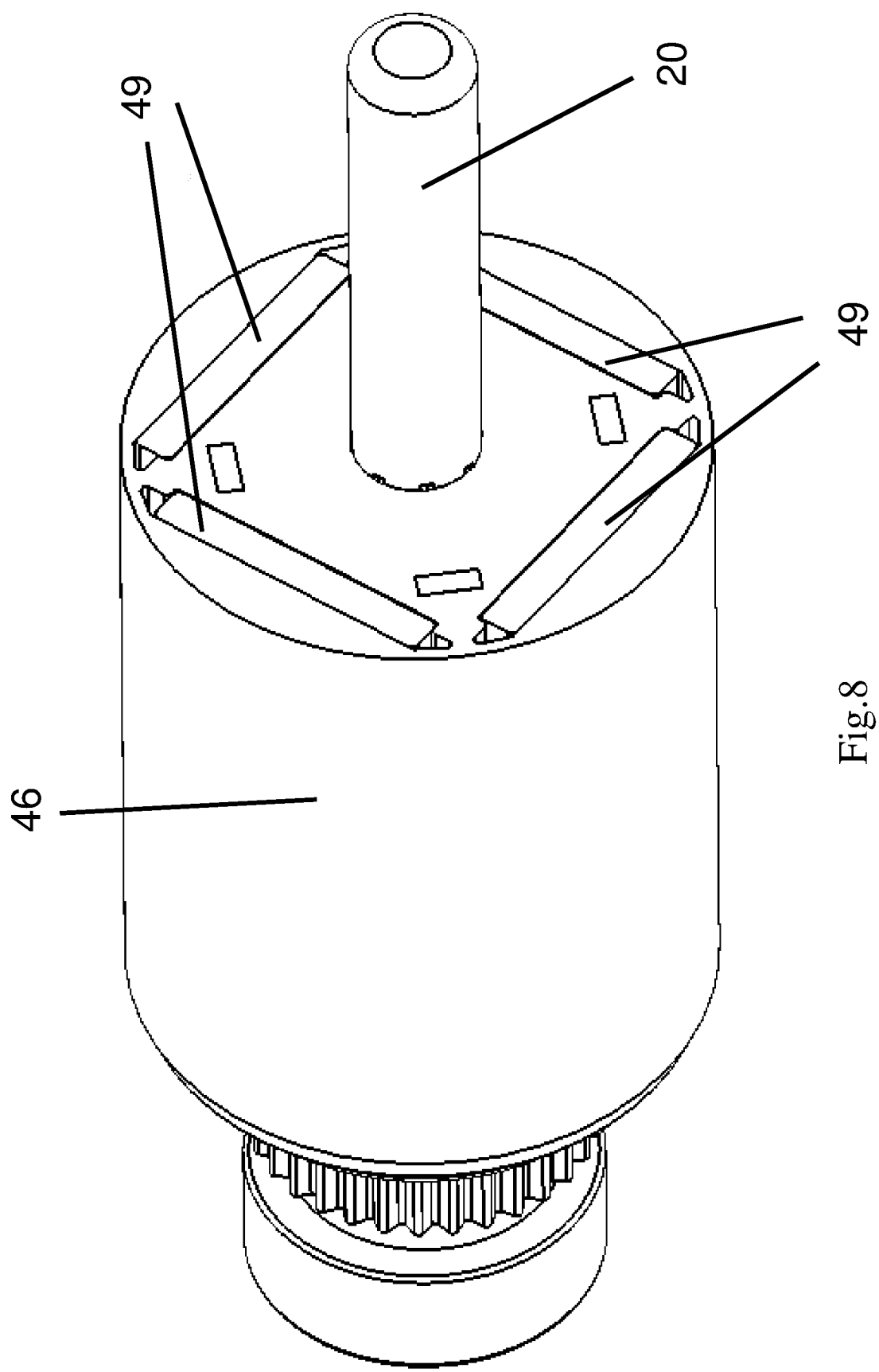
FIG. 8 shows the rotor of the brushless motor in FIG. 1 where the rotor is fixed to the motor shaft.

FIG. 8 shows the structure of the rotor of the brushless can motor in FIG. 1. As mentioned above the rotor includes a rotor core 46 and four plate permanent magnets 49. In the rotor core 46 there are formed four slots of which the interior cavities have a substantially plate shape, so as to receive the plate permanent magnets 49. Preferably the magnets slots in the rotor core 46 are located as far away from the central axis of the rotor as possible.

The operation of the brushless DC motor described above is similar to conventional brushless DC motors as would be appreciated by person skilled in the art based on the structures of the motor described above. Therefore it will not be described in details here.

Figure 9:
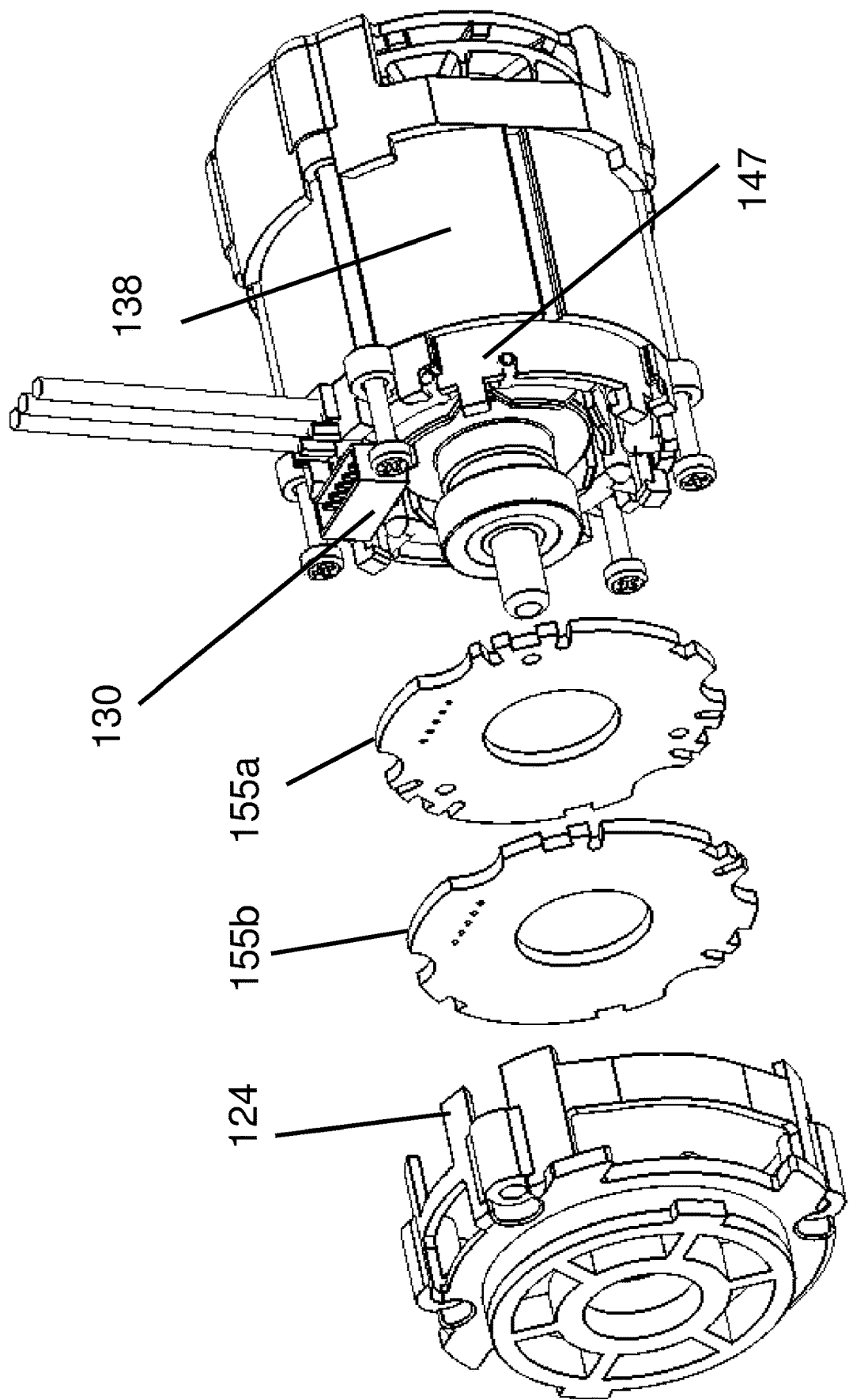
FIG. 9 shows the appearance of a brushless motor according to another embodiment of the present invention, with one end cap detached to show the circuit boards in the motor.

In another embodiment as shown in FIG. 9, the brushless DC motor has a generally same structure as that illustrated in FIGS. 1-8. However, the difference in this embodiment is that as shown in FIG. 9 there are two circuit boards 155a and 155b in the motor, each of which is in a full circular shape compared to the semicircle shape of the circuit board in FIG. 4. One or both of the circuit boards 155a and 155b may contain rotor status sensing components like the Hall sensors. The two circuit boards 155a and 155b are stacked along the axis direction of the brushless motor, and are secured between the first end cap 124 and the first insulating plate 147. The socket 130 is electrically connected to the circuit board 155a and/or 155b and the external motor controller (not shown) is able to read the rotor status from the Hall sensors.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

The brushless can motors in the above embodiments have screw holes on one of the end caps to allow the use of screws to secure the brushless can motor to housing of electrical appliance to which the brushless can motor is installed. However, skilled persons in the art would understand that based on the installation requirement it is also possible to arrange screw holes on both end caps of the motor, so that more contact points may be formed between the motor and the electrical appliance housing. In addition, the screws and screw holes are just one example of fastening means to connect the motor, and skilled persons could easily think of using other types of fastening means to achieve the same effect, including but not limited to bolts, snap joint, etc.

The invention claimed is:
1. A brushless can motor, comprising:
a motor shaft;
a rotor fixed to said motor shaft; said rotor comprising a plurality of magnets;
a first end cap on which a first end of said motor shaft is rotatably supported;
a second end cap on which a second end of said motor shaft is rotatably supported;
a stator placed between said first end cap and said second end cap along a longitudinal direction of said brushless motor; said stator configured with a plurality of windings adapted to connect to an external motor controller; and a fan positioned between the stator and the second end cap;

wherein said first end cap, said second end cap and said stator are all formed in substantially cylindrical shape, such that said brushless motor, in its assembled form, has a substantially can shape.

2. The brushless can motor of claim 1, wherein said first end cap, said stator and said second end cap are secured together to form the exterior dimension of said brushless motor.

3. The brushless can motor of claim 2, wherein said first end cap, said stator and said second end cap are secured using a plurality of fasteners.

4. The brushless can motor of claim 3, wherein said fasteners are screws; each one of said first and second end caps comprising a plurality of receptacles each configured for receiving and securing an end of one said screw.

5. The brushless can motor of claim 4, wherein said stator further comprises a plurality of grooves formed on an exterior cylindrical surface of said stator; each said groove adapted to receive one said screw and allow the same to pass through said stator and connect to said first and second end caps at its ends; whereby said screws confining said stator in a predetermined position with respect to said first and second end caps.

6. The brushless can motor of claim 1, wherein a portion of an exterior surface of at least one of the first and second end caps is flattened to form a planar exterior face.

7. The brushless can motor of claim 1, further comprising a Hall sensor board placed adjacent to one of said first and second end caps.

8. The brushless can motor of claim 1, wherein at least one of the first and second end caps further comprises a plurality of fastening means for securing said brushless motor to an external apparatus.

9. The brushless can motor of claim 8, wherein said fastening means are screw holes.

10. The brushless can motor of claim 1, wherein the is fan enclosed by the second end cap.

11. The brushless can motor of claim 1, further comprising a first insulating plate positioned between the stator and the first end cap, and a second insulating plate positioned between the stator and the second end cap.

12. The brushless can motor of claim 11, wherein a receptacle is formed on each of the first end cap, the first insulating plate, the second insulating plate, and the second end cap.

13. The brushless can motor of claim 12, wherein a groove is formed on an exterior cylindrical surface of the stator.

14. The brushless can motor of claim 13, wherein the first end cap, the stator and the second end cap are secured together with a fastener, and wherein the fastener passes through the receptacle on the first end cap, the receptacle on the first insulating plate, the groove on the stator, the receptacle on the second insulating plate and the receptacle on the second end cap.

* * * * *